T. MIDGLEY.
TIRE FOR VEHICLE WHEELS.
APPLICATION FILED NOV. 23, 1908.
939,610.
Patented Nov. 9, 1909.
3 SHEETS—SHEET 1.
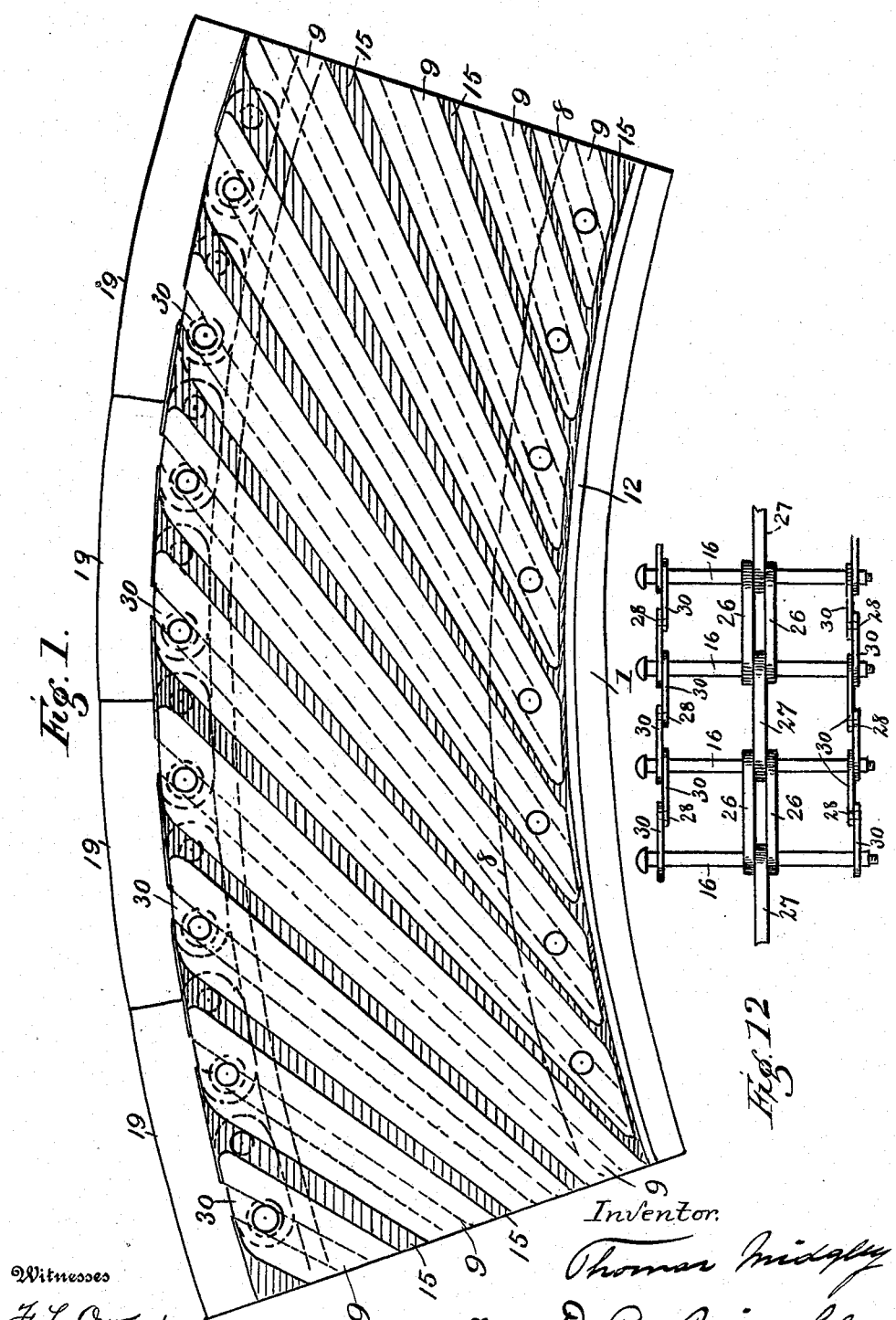

T. MIDGLEY.
TIRE FOR VEHICLE WHEELS.
APPLICATION FILED NOV. 23, 1908.
939,610.
Patented Nov. 9, 1909.
3 SHEETS—SHEET 2.
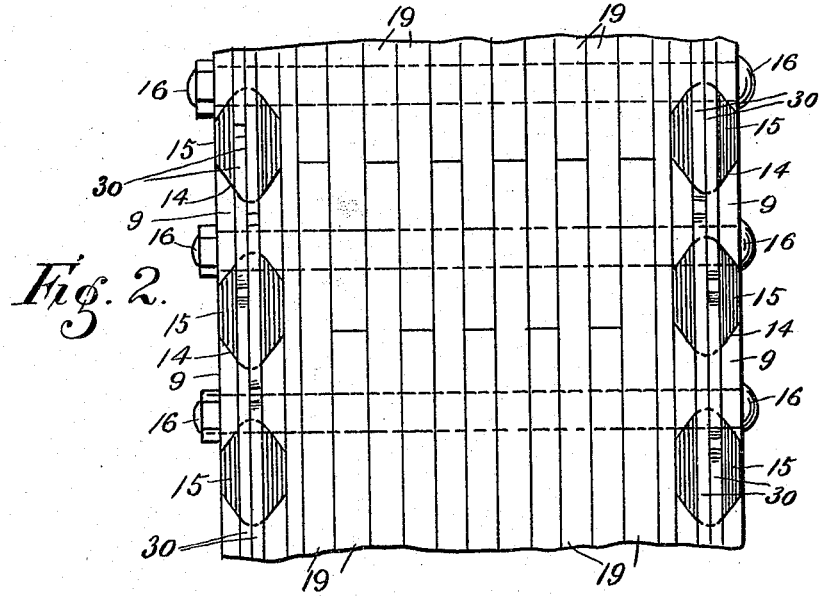
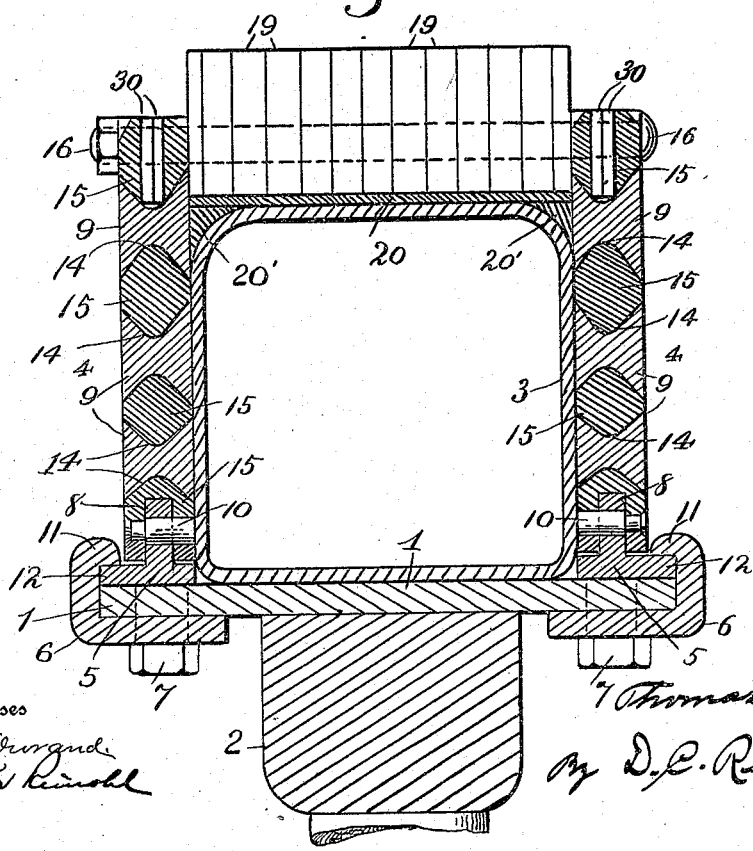

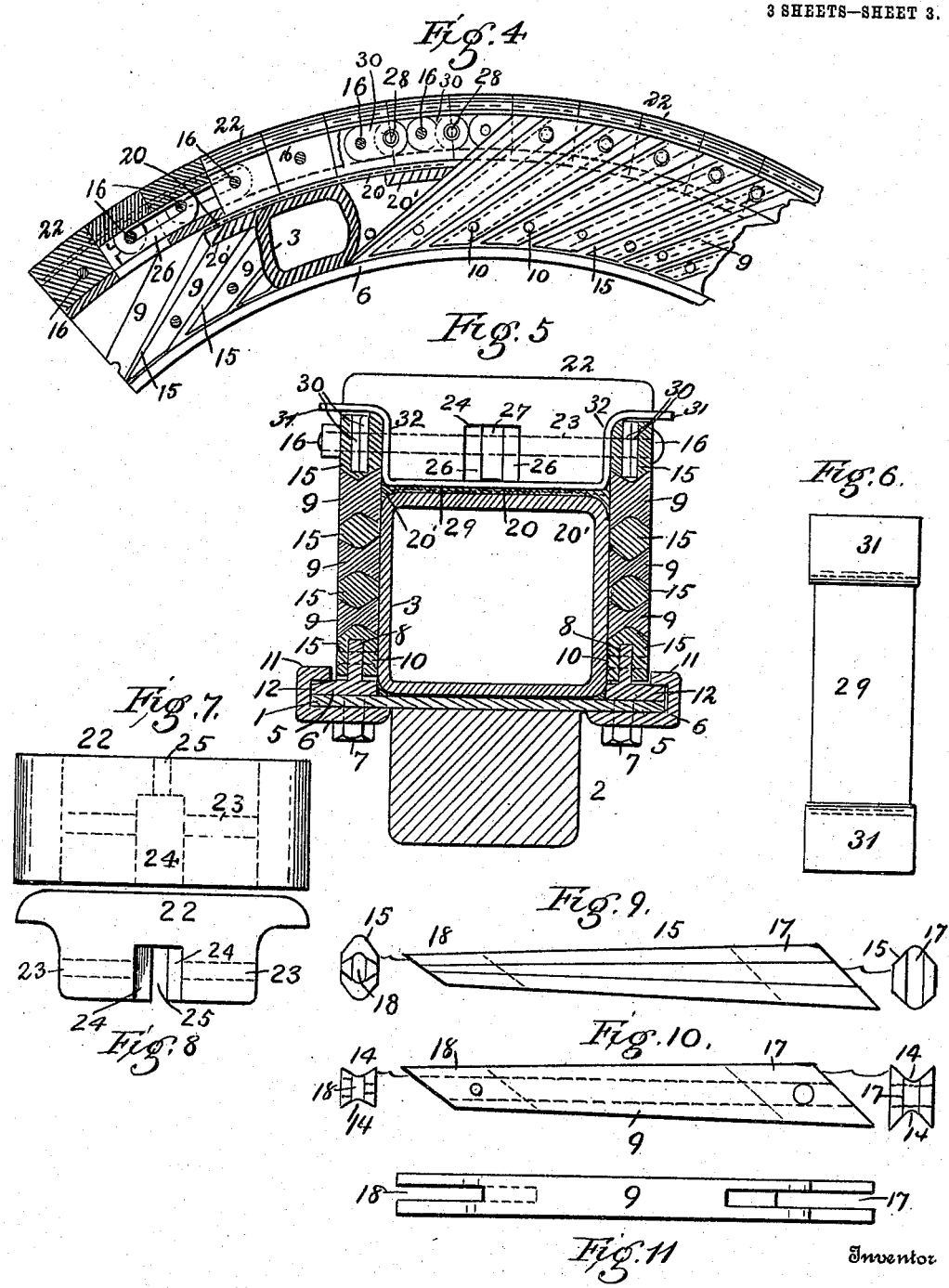

UNITED STATES PATENT OFFICE.

THOMAS MIDGLEY, OF WORTHINGTON, OHIO.

TIRE FOR VEHICLE-WHEELS.

939,610.   Specification of Letters Patent.   Patented Nov. 9, 1909.

Application filed November 23, 1908. Serial No. 464,169.

*To all whom it may concern:*

Be it known that I, THOMAS MIDGLEY, a citizen of the United States, residing at Worthington, in the county of Franklin and State of Ohio, have invented certain new and useful Improvements in Tires for Vehicle-Wheels; and I do hereby declare the following to be a full, clear, and exact description of the invention, such as will enable others skilled in the art to which it appertains to make and use the same.

My invention relates to tires for vehicle wheels, has especial reference to pneumatic tires designed for use on wagons or trucks for carrying heavy loads, has for its object the construction of tires capable of sustaining great weight and yet being sufficiently resilient to yield to irregularities in or obstructions on a road-bed, and the invention consists in certain improvements in construction, which will be fully disclosed in the following specification and claims.

In the accompanying drawings, which form part of this specification:—Figure 1 represents a side elevation of a section of a tire casing embodying my invention. Fig. 2 is a plan view. Fig. 3 is a transverse section. Fig. 4 is a side elevation partly in section of a modification of the invention on a reduced scale. Fig. 5 is a transverse section partly in elevation on an enlarged scale of the modification shown in Fig. 4. Fig. 6 is a plan view of one of the tread carriers detached. Fig. 7 is a top plan view of one of the tread members detached. Fig. 8 is an end view of the same. Fig. 9 is a detail of one of the resilient members forming the sides of the casing. Fig. 10 is a like view of one of the metallic members forming the sides of the casing. Fig. 11 is an edge view of the same, and Fig. 12 is a detail plan view showing the links and their connections.

Reference being had to the drawings and the designating characters thereon, the numeral 1 indicates the metallic rim, 2 the felly of a vehicle wheel, 3 the inflatable or pneumatic inner tube, 4 the outer or tire casing, 5 the tire bands forming the base or seat of the composite sides of the tire casing, and 6 the clamping rings for securing the tire as a whole to the vehicle wheel by means of bolts 7, or in any preferred manner. The bands 5 are made of metal and provided with a rib 8 to which the metallic members 9 of the sides of the casing are secured by rivets or bolts 10 or the like, and the flange 11 of the clamping ring 6 engages the outer side 12 of the base of the band 5, as shown in Figs. 3 and 5.

The sides of the tire casing 4, are composed of tapering metallic members 9 arranged at an angle to the tread of the tire, and are provided with longitudinal grooves 14, on their edges, and interposed between said members are like tapered resilient members 15 of rubber, whose edges conform to and engage the grooves 14 of the members 9, as shown in Figs. 3, 5 and 9. The upper ends of the members 9 are engaged by the transverse bolts 16, and the members 9 and 15 are provided with a slot 17 at their upper end to receive metallic links 30, and with a slot 18 at their lower end to receive the ribs 8 on band 5.

The tread of the tire may be composed of a plurality of sections 19, of leather, secured in position between the sides of the casing by the transverse bolts 16, and the sections are cemented together to form a cushioned tread or wearing surface for the tire.

20 indicates a lining of fabric or like material having corner filling pieces 20' cemented or vulcanized thereon, and interposed between the periphery of the inner tube 3 and the inner surface of the tread 19 to protect the inner tube 3 from wear and allow said tube to assume a rounded form at the corners under the filling pieces 20'.

Figs. 4, 5, 6, 7 and 8 illustrate another form of construction of the tread of the tire, and in which 29 indicates a sectional tread-carrier or support, the tread also being formed by a plurality of sectional tread-members 22, of rubber or other resilient material, which like the sections 19 are separately removable and renewable as the tire wears, without providing an entire new tread for the wheel. Each member 22 is provided with a transverse opening 23 to receive one of the bolts 16, and with slots 24 and 25, the former to receive the links 26 which are also engaged by the bolts 16, and the latter slot 25, to receive the link 27, placed between each pair of links 26, 26, which link 27, engages adjacent bolts 16. Each link 30 is engaged by bolts 16, and is connected to the adjacent link by a rivet 28, as shown in Figs. 4 and 12. The links extend throughout the entire casing, one set of links 30 on each side, and one set of the links 26, 26 and 27 in the transverse center of the casing. The tread carrier 29 is made of stamped sheet metal, preferably steel, and is provided with laterally extending flanges 31 which project out sufficiently to cover the heads and the nuts of the bolts 16, as shown in Fig. 5, and is engaged by the bolt 16 passing through the walls 32 thereof. The links 26, 26, and 27 and the links 30 and the transverse bolts 16 take the strain on the periphery of the tire, and contribute materially to the strength thereof, while the sectional tread-members 22 take the surface wear of the tire and are renewable as required.

This latter described construction forms subject-matter of a divisional application for a patent filed February 10th, 1909, Serial Number 477,040.

The composite sides of the tire-casing are sufficiently resilient to accommodate the flexure of the sides and yet are of such strength as to sustain the weight generally carried by truck or other vehicles for transporting heavy loads.

Changes may be made in the details of construction of the several parts without departing from the spirit of my invention.

Having thus fully described my invention, what I claim is—

1. A tire for vehicle wheels provided with a casing whose sides are composed of interlocked alternate flexible and inflexible members.

2. A tire for vehicle wheels provided with a casing whose sides are composed of tapering alternate flexible and inflexible members.

3. A tire for vehicle wheels provided with a casing whose sides are composed of alternate flexible and inflexible members arranged at an angle to the tread of the tire.

4. A tire for vehicle wheels provided with a casing whose sides are composed of tapering alternate flexible and inflexible members, and having a tread detachably secured between the sides.

5. A tire for vehicle wheels provided with a casing having sides composed of flexible and inflexible members, base plates to engage the rim of the wheel and to which said sides are secured, and a separate tread interposed and secured between the sides.

6. A tire for vehicles provided with a casing having sides composed of flexible and inflexible members, base plates to engage the rim of a wheel and to which said sides are secured, links extending throughout the circumference of the casing, a separate tread, and transverse bolts extending through said sides, links and tread.

7. A tire for vehicles provided with a casing composed of separate sides, reinforcing metallic links embedded in the periphery of said sides, a separate tread, and transverse bolts engaging said sides, links and tread.

8. A tire for vehicles provided with a casing whose sides are composed of tapering and grooved members and resilient members in the grooves of the aforesaid members, and a tread detachably secured between said sides.

In testimony whereof I affix my signature, in presence of two witnesses.

THOMAS MIDGLEY.

Witnesses:
CHARLES S. M. TRUNNY,
MARGUERITE IMMEL.